United States Patent
Clark-Heinrich et al.

(10) Patent No.: US 11,480,078 B2
(45) Date of Patent: Oct. 25, 2022

(54) AUTOMOTIVE SENSOR WITH SERVICE COMPONENT AUTHENTICITY DETECTION

(71) Applicant: CUMMINS FILTRATION IP, INC., Columbus, IN (US)

(72) Inventors: Erica C. Clark-Heinrich, Cookeville, TN (US); Thomas J. Braun, Fall River, WI (US); Daniel Potratz, Stoughton, WI (US); Bharadwaj R. Prabhala, Columbus, IN (US); Abhijeet Vaidya, Columbus, IN (US); Sonal Laxman Chirme, Pune (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 162 days.

(21) Appl. No.: 16/761,066

(22) PCT Filed: Nov. 6, 2018

(86) PCT No.: PCT/US2018/059417
§ 371 (c)(1),
(2) Date: May 1, 2020

(87) PCT Pub. No.: WO2019/090319
PCT Pub. Date: May 9, 2019

(65) Prior Publication Data
US 2020/0347760 A1    Nov. 5, 2020

Related U.S. Application Data

(60) Provisional application No. 62/581,974, filed on Nov. 6, 2017.

(51) Int. Cl.
*F01M 11/10*    (2006.01)
*F01M 1/10*    (2006.01)
(Continued)

(52) U.S. Cl.
CPC .............. *F01M 11/10* (2013.01); *F01M 1/10* (2013.01); *F01M 11/03* (2013.01); *G01M 15/04* (2013.01); *F16N 2260/02* (2013.01)

(58) Field of Classification Search
CPC .......... F01M 11/10; F01M 1/10; F01M 11/03; G01M 15/04; F16N 2260/02
See application file for complete search history.

(56) References Cited

U.S. PATENT DOCUMENTS 6,898,489 B1    5/2005    Hayes, Sr.
7,576,657 B2    8/2009    Duron et al.
(Continued)

FOREIGN PATENT DOCUMENTS

CN    202351899 U    7/2012
CN    105636664 A    6/2016
(Continued)

OTHER PUBLICATIONS

International Search Report & Written Opinion for PCT/US2018/059417 dated Jan. 17, 2019, 16 pages.
(Continued)

*Primary Examiner* — Jacob M Amick
*Assistant Examiner* — Charles J Brauch
(74) *Attorney, Agent, or Firm* — Foley & Lardner LLP (57) ABSTRACT

Systems and methods for determining, using service component authenticity detection contained in a sensor module, whether an authorized or genuine service component element is installed in an automotive system are described. The authorized service component determination may be based on close-range communication technology such as radio frequency identification ("RFID") technology. An antenna in the sensor module may read the tag information from installed service component elements in a nearby service component and send any detected information into a filtra- (Continued)

tion monitoring system. The filtration monitoring system or a remote diagnostic system analyzes the returned data (or absence thereof) to determine if a genuine (i.e., authorized, OEM approved, etc.) service component element is installed or not.

21 Claims, 6 Drawing Sheets (51) Int. Cl.
*F01M 11/03* (2006.01)
*G01M 15/04* (2006.01)

(56) References Cited

U.S. PATENT DOCUMENTS

| | | |
|---|---|---|
| 7,902,984 B2 | 3/2011 | Duron et al. |
| 8,390,456 B2 | 3/2013 | Puleston et al. |
| 8,673,137 B2 | 3/2014 | Verdegan et al. |
| 10,184,415 B2 | 1/2019 | Shimpi et al. |
| 2007/0222609 A1 | 9/2007 | Duron et al. |
| 2007/0271014 A1 | 11/2007 | Breed |
| 2008/0136619 A1 | 6/2008 | Moran |
| 2009/0165546 A1* | 7/2009 | Cook .................. B60C 23/0496 73/146.5 |
| 2010/0087983 A1 | 4/2010 | Boss et al. |
| 2011/0220560 A1 | 9/2011 | Verdegan et al. |
| 2014/0144819 A1 | 5/2014 | Verdegan et al. |
| 2014/0191030 A1 | 7/2014 | Reineccius et al. |
| 2015/0218872 A1 | 8/2015 | Breed |
| 2017/0173505 A1* | 6/2017 | Dhingra ............... B01D 35/143 |

FOREIGN PATENT DOCUMENTS

| | | |
|---|---|---|
| DE | 102007035351 | 1/2009 |
| WO | WO-2006/015349 | 2/2006 |
| WO | WO-2007/109451 | 9/2007 |
| WO | WO-2011/112702 A2 | 9/2011 |
| WO | WO-2016/140651 | 9/2016 |

OTHER PUBLICATIONS

First Office Action issued for Indian Patent Application No. 202047012816 dated May 29, 2021.

Chinese Office Action issued for Chinese Patent Application No. CN 201880069924.3 dated Jun. 30, 2021, 8 pages.

* cited by examiner

AUTOMOTIVE SENSOR WITH SERVICE COMPONENT AUTHENTICITY DETECTION

CROSS-REFERENCE TO RELATED PATENT APPLICATIONS

The present application is the U.S. national phase of PCT Application No. PCT/US2018/059417, filed on Nov. 6, 2018, which claims the benefit of and priority to Provisional Patent Application No. 62/581,974, filed on Nov. 6, 2017, which are hereby incorporated by reference herein in their entireties.

TECHNICAL FIELD

The present application relates to automotive systems with service components including filtration systems for use with internal combustion engine systems or the like.

BACKGROUND

Internal combustion engines generally combust a mixture of fuel (e.g., gasoline, diesel, natural gas, etc.) and air. Prior to entering the engine, fluids such as fuel, oil, and air are typically passed through service component elements to remove contaminants (e.g., particulates, dust, water, etc.) from the fluids prior to delivery to the engine. The service component elements require periodic replacement as the filter media of the service component elements captures and removes the contaminants from the fluids passing through the filter media. In some instances, the service component element may be replaced with a non-genuine or a non-authorized replacement service component element. Oftentimes, the system operator and/or the service technician may not know that a non-genuine or non-authorized replacement service component element has been installed due to advanced counterfeiting techniques. In these instances, the non-authorized replacement service component element may not conform to original manufacturer performance and safety parameters. Accordingly, the non-authorized replacement service component element may allow more contaminants to pass through the automotive system (e.g., a filtration system) thereby damaging any downstream components (e.g., the internal combustion engine, pumps, turbochargers, etc.).

SUMMARY

Various example embodiments relate to systems and methods for using an antenna as part of a sensor package for verifying a service component element that has been installed in an automotive system as being a genuine (i.e., authentic or manufacturer approved) service component element. In some embodiments, the antenna is a standalone antenna operably connected to a wiring harness. In some embodiments, the sensor package comprises the antenna and/or a close-range communication tag reader.

One such embodiment relates to an apparatus comprising an automotive system configured to operably connect to a service component. A sensor module comprises a sensing element structured to sense a characteristic associated with the service component when the service component is operably connected to the automotive system. The sensor module further comprises an antenna structured to communicate service component tag information of a tag associated with the service component to a close-range communication reader. A monitoring system comprises a processing circuit communicatively coupled to the sensor. The processing circuit comprises a processor and memory. The memory comprises instructions which, when executed by the processor, cause the processing circuit to receive the service component tag information from the sensor module.

In some embodiments, the automotive system is a filtration system and the monitoring system is a filtration monitoring system. In some embodiments, the apparatus further comprises a service component authentication system configured to compare the service component tag information with a list of verified genuine service component information, and the memory further comprises instructions that cause the processing circuit to transmit the service component tag information to the service component authentication system. In some embodiments, the apparatus further comprises an engine control module. The memory further comprises instructions that cause the processing circuit to transmit status information comprising a result of the comparison to the engine control module. The sensor module may comprise the close-range communication reader, the antenna, and the close-range communication reader contained in a housing of the sensor module. The close-range communication reader may be a radio frequency identification ("RFID") reader, and the tag associated with the service component may be an RFID tag. In some embodiments, the service component tag information is encrypted. The service component authentication system may be further configured to decrypt the service component tag information and the decrypted service component tag information is what is compared with the list of verified genuine service component information. In some embodiments, the service component authentication system is further configured to determine the service component is non-genuine based on the comparison and transmit a non-genuine alert to the monitoring system consequent to the determination. The monitoring system may transmit the non-genuine alert to an engine control module. The engine control module may be configured to trigger a visual warning or auditory warning consequent to receiving the non-genuine alert.

Another embodiment relates to an apparatus comprising a sensor module. The sensor module comprises a sensing element and an antenna. The sensing element may be structured to sense a characteristic associated with a service component when the service component is operably connected to a filtration system. The antenna is structured to communicate service component tag information of a tag associated with the service component to a close-range communication reader. The apparatus may further comprise a filtration system configured to operably connect to the service component and a filtration monitoring system comprising a processing circuit communicatively coupled to the sensor module. The processing circuit comprises a processor and memory. The memory comprises instructions which, when executed by the processor, cause the processing circuit to receive the service component tag information from the sensor module, and compare the service component tag information with a list of verified genuine service component information. In some embodiments, the sensor module comprises the close-range communication reader. The antenna and the close-range communication reader may be contained in a housing of the sensor module. In some embodiments, the close-range communication reader may be an RFID reader, wherein the tag associated with the service component comprises an RFID tag. In some embodiments, wherein the service component tag information is encrypted, the memory of the filtration monitoring system further comprises instructions which cause the processing circuit to decrypt the service component tag information. The decrypted service component tag information is what is compared with the list of verified genuine service component information. In some embodiments, the apparatus further comprises an engine control module. The memory may further comprise instructions that cause the processing circuit to determine the service component is non-genuine based on the comparison and transmits a non-genuine alert to the engine control module consequent to the determination. The engine control module may be configured to trigger a visual warning or auditory warning consequent to receiving the non-genuine alert. The visual warning may be a dashboard light and the auditory warning may be an alarm.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, systems and methods for determining whether an authorized or genuine service component element is installed in an automotive system (e.g., a filtration system) are described. In some arrangements, a filter monitoring system provides feedback as to whether a genuine (i.e., authorized, OEM approved, etc.) or an unauthorized service component element is installed in a given automotive system. The authorized service component determination may be based on RFID technology. For example, each authorized service component (e.g., a filter cartridge) may be assembled with an RFID tag, which is programmed with a unique code. In some arrangements, the unique code is specific to a given service component element. In other arrangements, the unique code is specific to a class of service component elements (e.g., all service component elements having the same model number). RFID readers with antennas in the monitored filter systems read the RFID tag information from the installed service component elements and feed any detected information into the filtration monitoring system. The filtration monitoring system or a remote diagnostic system analyzes the returned data (or absence thereof) to determine if a genuine (i.e., authorized, OEM approved, etc.) service component element is installed or not. In some other arrangements, a code (e.g., barcode, two-dimensional barcode, holographic code, RFID tag, etc.) on the service component element or packaging is scanned via a computing device by a technician installing the service component element in an automotive system. The information gathered from the code is then transmitted by the computing device to a remote diagnostic system to determine if a genuine (i.e., authorized, OEM approved, etc.) service component element is installed or not. The described systems may be used as stand-alone systems or as complimentary systems at the same time (e.g., to provide a two-factor authentication of an installed service component element).

Figure 1:
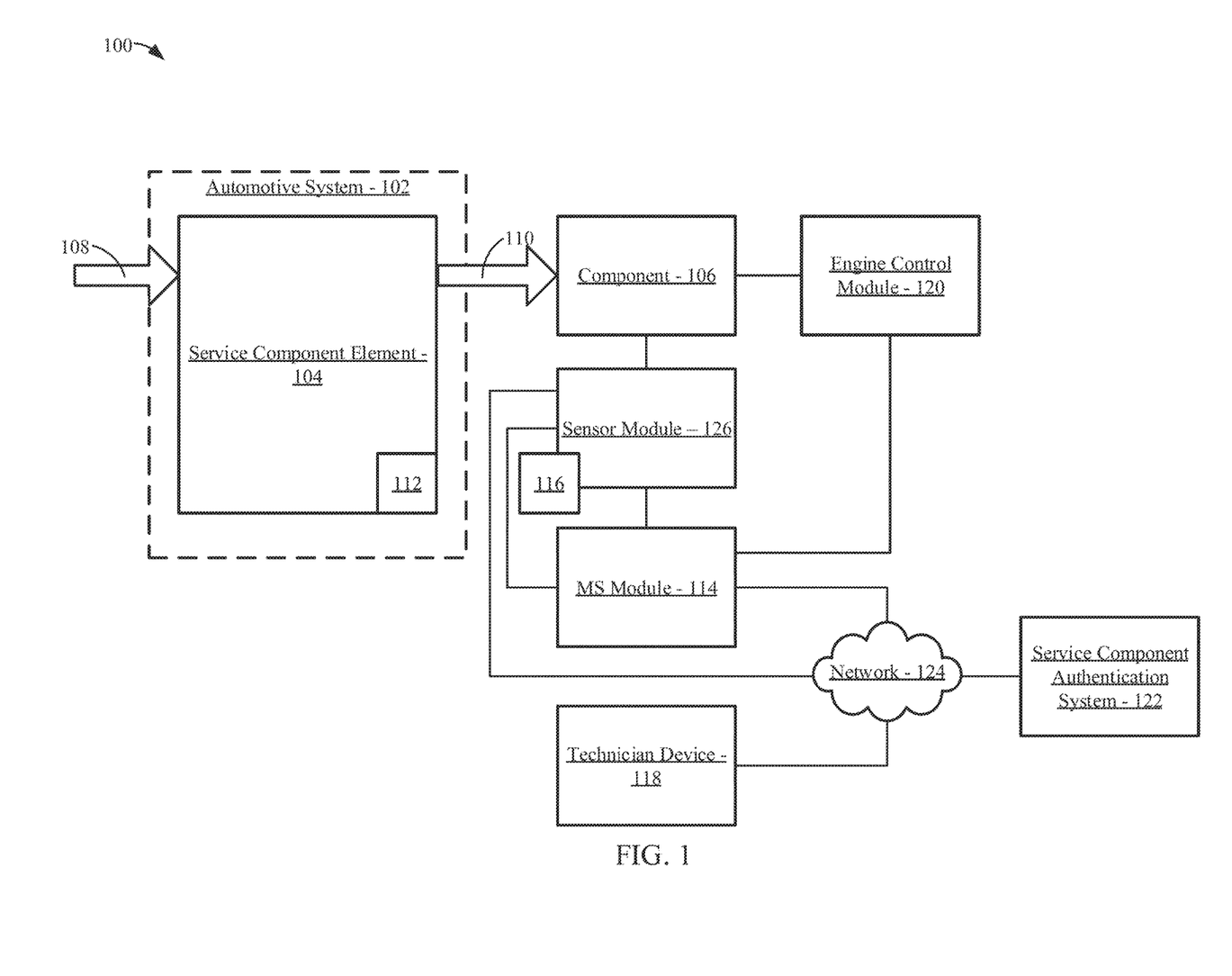
FIG. 1 shows a schematic view of a system according to an example embodiment.

Referring to FIG. 1, a system 100 is shown according to an example embodiment. As shown in FIG. 1, the system 100 includes an automotive system 102 having a service component element 104 installed in the automotive system 102. The automotive system 102 may, for example, filter a fluid via the service component element 104 and provide the filtered fluid to a component 106 (e.g., an internal combustion engine, a pump, etc.). For example, the automotive system 102 may comprise an air filter system that filters intake air for an internal combustion engine (e.g., a diesel internal combustion engine). Accordingly, the automotive system 102 includes a fluid inlet 108 that provides fluid to be filtered to the service component element 104, and a fluid outlet 110 that provides filtered fluid to the downstream component 106. Although shown as including one automotive system 102, it should be understood that system 100 can include any number of automotive systems 102 and is applicable to any combination of an air filtration system, a fuel filtration system, a lubricant filtration system, a fuel-water separator, a hydraulic fluid filtration system, or the like.

The service component element 104, in some embodiments, comprises a filter element including filter media and at least one frame member. In arrangements where the service component element 104 comprises a cylindrical filter element, the frame member may include at least one of a first endcap and a second endcap that are secured to the filter media. As described in further detail below, the service component element 104 is intended to be a genuine (i.e., authorized) service component element. As used herein, the terms "genuine" and "authorized" are used to describe service component elements that are approved by the manufacturer and/or operator of the automotive system 102 for use within the automotive system 102. Accordingly, the service component element 104 includes at least one tag 112. The tag 112 may be secured to any component of the service component element 104 (e.g., an endcap, a filter media, the frame, etc.) or the packaging of the service component element 104. In some arrangements, the tag can be embedded in the frame member (e.g., embedded in a top or bottom endcap of the service component element). The tag may be an RFID tag, a barcode, a two-dimensional barcode (e.g., a QR code or the like), a cryptographic tag, a holographic tag, a combination thereof, and the like. In some arrangements, the service component element 104 may include two tags 112 of the same format (e.g., each of the tags is an RFID tag) or different format (e.g., one tag is an RFID tag while the other tag is a barcode). The tag 112 is encoded with information that is used to verify the service component element 104 as being a genuine service component element. In some arrangements, the information on the tag 112 is read by a monitoring system ("MS") module 114, for example a filter monitoring system, via a tag reader 116. In other arrangements, the information on the tag 112 is read by a technician device 118 (e.g., a smartphone, a tablet computing device, a PDA, a laptop computer, etc.) at the time the service component element 104 is installed in the automotive system 102. In further arrangements, the information on the tag 112 is read by both the MS module 114 and the technician device 118.

In some arrangements, the MS module 114 is also structured to monitor the status of the automotive system 102 and the installed service component element 104. For example, the MS module 114 can monitor sensor feedback information relating to the automotive system 102 (e.g., pressure sensors, temperature sensors, fluid quality sensors, etc.) to determine when the service component element 104 requires replacement. Accordingly, the MS module 114 may be configured in the same manner as set forth in U.S. patent application Ser. No. 14/977,858, entitled "FILTRATION MONITORING SYSTEMS," filed on Dec. 22, 2015, U.S. Provisional Patent Application No. 62/320,030, entitled "SYSTEM AND METHOD FOR CALCULATING REMAINING USEFUL LIFE AND CURRENT FILTER STATUS FOR FUEL AND LUBE FILTERS," filed on Apr. 8, 2016, and/or U.S. Provisional Patent Application No. 62/357,067, entitled "SYSTEM AND METHOD FOR OUTPUTTING FILTER MONITORING SYSTEM INFORMATION VIA TELEMATICS," filed on Jun. 30, 2016, each of which are herein incorporated by reference in their entireties and for all purposes. In arrangements where the component 106 is an internal combustion engine, the MS module 114 is structured to communicate information with an engine control module 120 (e.g., via a J1939 vehicle bus data link). The engine control module 120 is structured to control the operation of the internal combustion engine. As such, the MS module 114 can trigger an alert (e.g., a dashboard warning) to an operator of the internal combustion engine via the engine control module 120 if the service component element 104 is determined to be non-authorized and/or non-genuine. In some arrangements, the MS module 114 is integrated with the ECM 120.

Both the MS module 114 and the technician device 118 are configured to provide information gathered from the tag 112 to a service component authentication system 122. The MS module 114 and the technician device 118 are configured to transmit the information via a network 124 (e.g., the Internet) to the service component authentication system 122. The MS module 114 and the technician device 118 can communicate data to and from the service component authentication system 122 via the network 124 through any combination of wired data transmission (e.g., Ethernet, USB, etc.) and wireless data transmission (e.g., WiFi, Bluetooth, Zigbee, cellular, etc.) protocols. Accordingly, in some arrangements, the service component authentication system 122 is remote and physically separate from the automotive system 102, the MS module 114, and/or the component 106 in the sense that data is communicated between the MS module 114 and the service component authentication system 122 through a network 124 (e.g., an external network, such as the Internet) instead of directly. For example, in arrangements where the automotive system 102 and the MS module 114 are part of a vehicle powered by an internal combustion engine (i.e., the component 106), the service component authentication system 122 may be part of a remote telematics and diagnostic center that is physically separate from the vehicle. In such arrangements, the MS module 114 can communicate the service component element tag information to the authentication system 122 via a datalink established by a telematics system or a data transceiver (e.g., transceiver 214 discussed below with respect to FIG. 2) over the network 124. The service component authentication system 122 may be affiliated with the manufacturer or operator of the automotive system 102 and/or the service component element 104.

The service component authentication system 122 verifies that the service component element 104 installed in the automotive system 102 is a genuine or authorized service component element by comparing the received information from the tag 112 with known and verified information. Additionally, the service component authentication system 122 can maintain historical information relating to used service component elements. In some arrangements, the MS module 114 is configured to locally verify that the service component element 104 installed in the automotive system 102 is a genuine or authorized service component element by comparing the received information from the tag 112 with known and verified information.

The sensor module 126 monitors one or more parameters of the system 100, for example for the component 106, and communicates outputs data associated with the one or more parameters to another component of the system 100, for example, the MS module 114. The sensor module 126 may include a wiring harness to communicate to other components of system 100. The sensor module 126 may comprise an antenna electrically connected to a close-range communication reader (e.g., tag reader 116) or a potential location for both the antenna and the other components of the close-range communication reader. The sensor module 126 may further comprise other components of the close-range communication reader needed to receive and decode the signals from the antenna. In some embodiments, the antenna and/or close-range communication reader components are integrated into an independent dongle integrated into a wiring harness connection to the sensor module 126. The close-range communication reader may also be integrated into the dongle. The antenna and/or close-range communication reader may also be integrated into the wiring harness with a connection that is a splice that overlays the transmitted message (e.g., a controller area network ("CAN") message) to a data line of the wiring harness. The power to the close-range communication reader can be provided by the same wire(s) from the wiring harness providing power to the sensor module 126.

In some embodiments, sensor module 126 is CAN-based and provides additional information to the MS module 114 including signals received from the antenna electrically connected to a close-range communication reader (e.g., tag reader 116). The sensor module 126 may also provide information directly to the ECM 120, a stand-alone service tool, or an aftermarket vehicle monitoring system. The information includes an indication if a service component (e.g., service component element 104) is authentic. Other information, for example a date code, can be transmitted.

In some embodiments, the antenna electrically connected to a close-range communication reader (e.g., tag reader 116) or both the antenna and the other components of the close-range communication reader is integrated as an electrical connection by an independent splice between the sensor module 126 and a wiring harness. The splice is electronically connected to the sensor module 126 and the wiring harness contains an additional output pin to send a signal through the wiring harness that a service component is authentic. In some embodiments, the reader is directly embedded in the wiring harness without a splice. The power to the close-range communication reader can be provided by the same wire(s) from the wiring harness providing power to the sensor module 126.

In some embodiments, the sensor module 126 comprises an additional pin that gives a high/low output indicating whether the service component is authentic. For example, the close-range communication reader (e.g., tag reader 116) is integrated into the sensor module 126 but the output is high/low on a pin connected to a wiring harness giving an indication that a service component (e.g., service component element 104) is authentic.

The components of and the operation of the system 100 is described in further detail below with respect to FIGS. 2 through 6.

Figure 2:
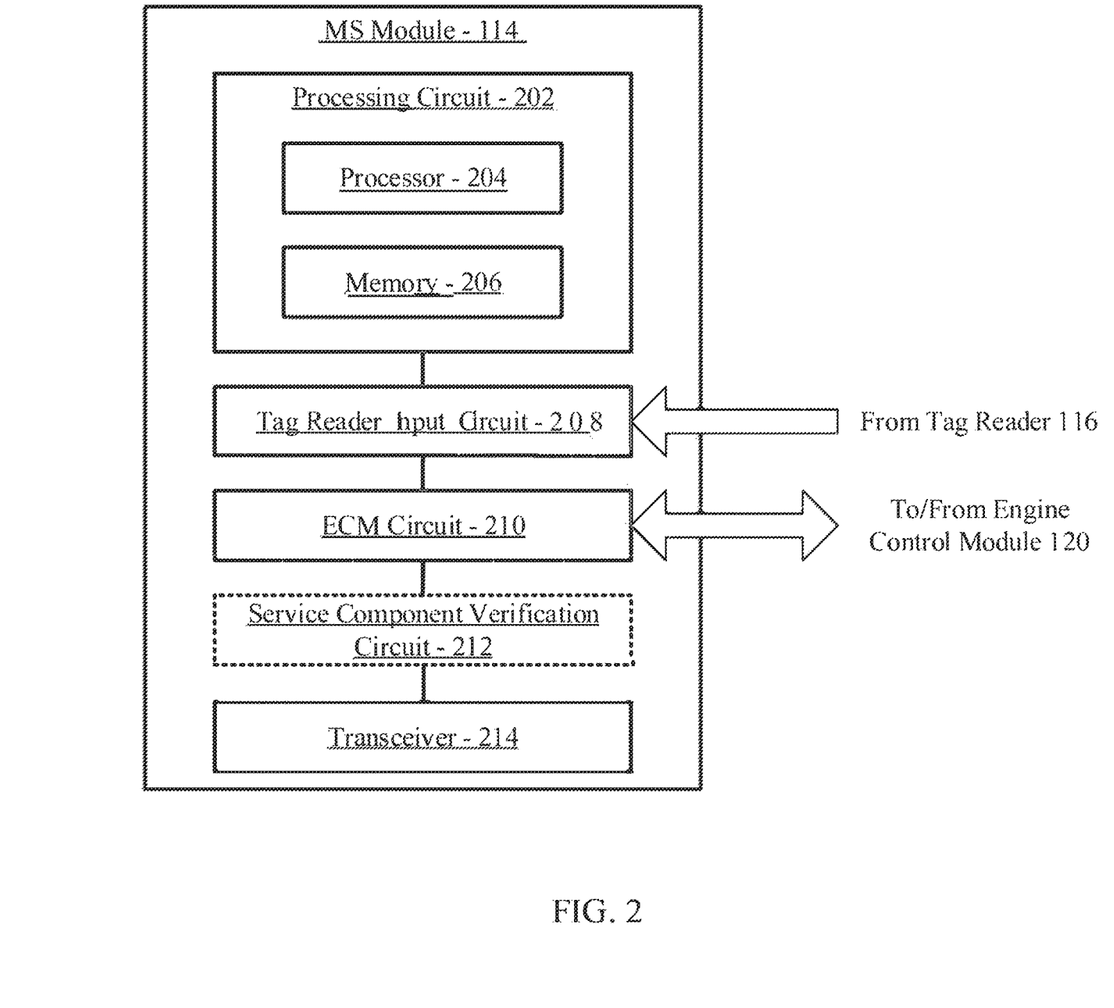
FIG. 2 shows a block diagram of the filter monitoring system module of FIG. 1.

Referring to FIG. 2, a block diagram of the MS module 114 is shown. The MS module 114 includes a processing circuit 202. The processing circuit 202 includes a processor 204 and memory 206. The processor 204 may be a general-purpose processor, an application specific integrated circuit (ASIC), a programmable logic controller (PLC) chip, one or more field programmable gate arrays (FPGAs), a digital signal processor (DSP), a group of processing components, or other suitable electronic processing components. The memory 206 may include any of RAM, NVRAM, ROM, Flash Memory, hard disk storage, or the like. The processor 204 is structured to execute instructions stored in the memory 206 that cause the processor 204 to control the operation of the MS module 114. In some arrangements, the memory 206 may also include one or more storage devices (e.g., hard drives, flash drives, computer readable media, etc.) either local or remote from the MS module 114. The memory 206 can be configured to store look up tables, algorithms, and/or instructions. Such algorithms can include, for example, service component tag verification algorithms.

The MS module 114 includes a tag reader input circuit 208, an ECM circuit 210, and a service component verification circuit 212. In some arrangements, each of the tag reader input circuit 208, the ECM circuit 210, and the service component verification circuit 212 are separate from the processing circuit 202 (e.g., as shown in FIG. 2). In other arrangements, the processing circuit 202 includes any or all of the tag reader input circuit 208, the ECM circuit 210, and the service component verification circuit 212.

The tag reader input circuit 208 is structured to receive information from the tag 112 that is read by the tag reader 116. As described in further detail below, the received information is used to verify that the service component element 104 installed in the automotive system 102 is genuine and authorized.

The ECM circuit 210 is structured to communicate information to and from the engine control module 120. Accordingly, through the ECM circuit 210, the internal combustion engine can provide a real-time feedback signal relating to engine operating parameters (e.g., speed, temperature, oil pressure, etc.) to the MS module 114 via the engine control module 120. The real-time feedback of the engine operating parameters may occur via a datalink (e.g., a CANBUS link, a J1939 vehicle bus data link, etc.) with the engine control module 120 via the ECM circuit 210. Additionally, via the ECM circuit 210, the MS module 114 can send messages to the engine control module 120 (e.g., to trigger a dashboard warning, to trigger an alarm, to shut off the internal combustion engine, to derate the internal combustion engine, etc.). In some arrangements, the MS module 114 is part of or integrated with the engine control module 120. In such arrangements, the ECM circuit 210 may be structured control the operation of the internal combustion engine.

The service component verification circuit 212 is structured to decrypt and/or decode the information received from the tag 112 via the tag reader input circuit 208. The decrypted and/or decoded information is then used to verify that the service component element 104 installed in the automotive system 102 is genuine and authorized (e.g., as described in further detail below with respect to FIG. 6). As discussed above, in some arrangements, the MS module 114 performs the filter verification locally at the MS module 114. In other arrangements, the MS module 114 transmits the tag information to the service component authentication system 122 for filter verification. In such arrangements, the service component verification circuit 212 may be omitted from the MS module 114.

The MS module 114 also includes a data transceiver 214. The data transceiver 214 is structured to facilitate data communication over the network 124 to and from the service component authentication system 122. In some arrangements, the data transceiver 214 includes a wireless data transceiver, such as a WiFi data transceiver, a Bluetooth data transceiver, a cellular data transceiver (e.g., a 2G data transceiver, a 3G data transceiver, a 4G data transceiver, etc.). In some arrangements, the data transceiver 214 transmits data via a telematics module of the system 100.

Figure 3:
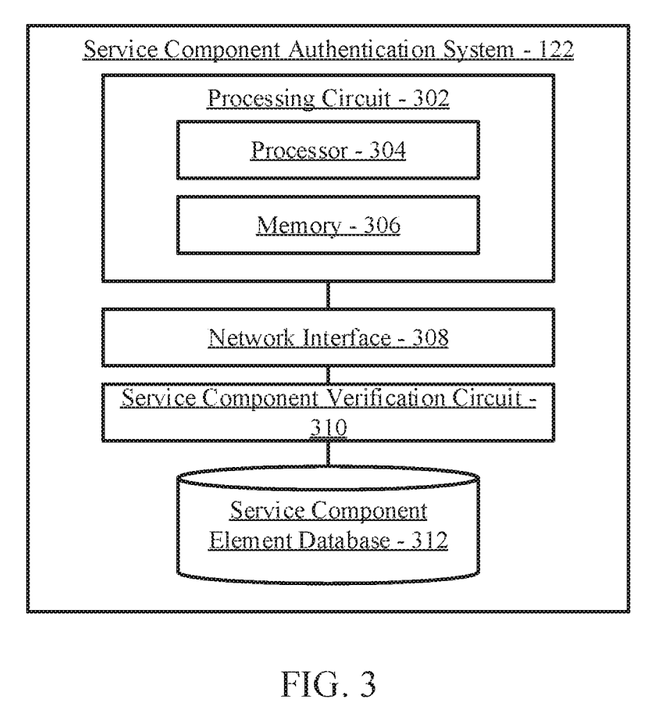
FIG. 3 shows a block diagram of the service component authentication system of FIG. 1.

Referring to FIG. 3, a block diagram of the service component authentication system 122 is shown. As noted above, in some arrangements, the service component authentication system 122 is remote from the MS module 114, the automotive system 102, and/or the service component element 104. The service component authentication system 122 includes a processing circuit 302. The processing circuit 302 includes a processor 304 and memory 306. The processor 304 may be a general-purpose processor, an application specific integrated circuit (ASIC), a programmable logic controller (PLC) chip, one or more field programmable gate arrays (FPGAs), a digital signal processor (DSP), a group of processing components, or other suitable electronic processing components. The memory 306 may include any of RAM, NVRAM, ROM, Flash Memory, hard disk storage, or the like. The processor 304 is structured to execute instructions stored in the memory 306 that cause the processor 304 to control the operation of the service component authentication system 122. In some arrangements, the memory 306 may also include one or more storage devices (e.g., hard drives, flash drives, computer readable media, etc.) either local or remote from the service component authentication system 122. The memory 306 can be configured to store look up tables, algorithms, and/or instructions. Such algorithms can include, for example, service component tag verification algorithms.

The service component authentication system 122 includes a network interface 308, a service component verification circuit 310, and a service component element database 312. The network interface 308 is structured to facilitate data communication with other devices (e.g., the MS module 114, the technician device 118, etc.) via the network 124. The service component verification circuit 310 is structured to decrypt and/or decode the information received from the tag 112 (e.g., as received via the sensor module 126, MS module 114 and/or the technician device 118). The decrypted and/or decoded information is then used to verify that the service component element 104 installed in the automotive system 102 is genuine and authorized (e.g., as described in further detail below with respect to FIG. 7). The service component authentication system 122 includes a service component element database 312. In some arrangements, the service component element database 312 is part of the memory 306. The service component element database 312 stores verified filter information that is used by the service component verification circuit 310 to determine whether the service component element 104 installed in the automotive system 102 is genuine and authorized. In some arrangements, the service component element database 312 also includes historic filter usage information (e.g., a record of when specific service component elements were installed in a given automotive system, a record of when non-genuine/non-authorized service component elements were installed in a given automotive system), which may be used to assist with warranty claims involving the system 100.

Figure 4:
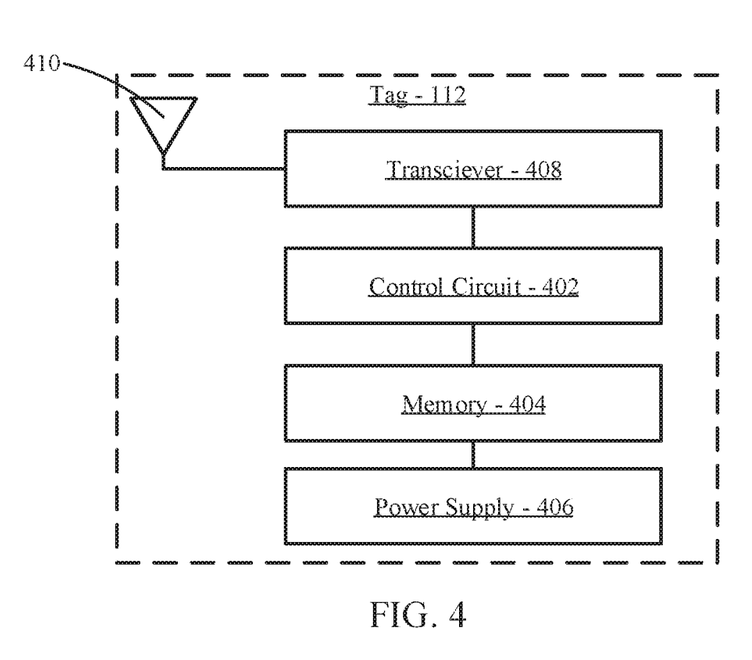
FIG. 4 shows a block diagram of a tag associated with a service component element according to an example embodiment.

Referring to FIG. 4, a block diagram of the tag 112 is shown according to an example embodiment. The tag 112 of FIG. 4 may be an RFID tag. The tag 112 may be an active, semi-active, or passive RFID tag. In some arrangements, the RFID tag 112 may be a cryptographic or holographic RFID tag. Accordingly, the tag 112 includes a control circuit 402, memory 404, a power supply 406, a transceiver 408, and an antenna 410. The control circuit 402 is structured to generally control the operation of the tag 112. When the tag 112 is brought into range of a reader (e.g., tag reader 116), the tag 112 wirelessly communicates a data packet stored in the memory 404 to the reader via the antenna 410 and the transceiver 408. In some arrangements, the tag 112 includes a power supply 406, such as a battery or a capacitor. In other arrangements, the tag 112 receives operating power wirelessly from the reader via the antenna 410.

The memory 404 is structured to store service component element 104 identification information that uniquely identifies a given service component element 104. Accordingly, the memory 404 may be programmed by the manufacturer of the service component element 104 at the time of manufacturing the service component element. In some arrangements, the identification information is a string of digits, symbols and numbers that form a unique identification number of the service component element 104. The unique identification number may be a serial number or another string formed by an algorithm or a plurality of algorithms (e.g., a different algorithm for different parts of a given code) associated with the manufacturer of the service component element 104. The unique identification number of the service component element 104 may include, for example, any combination of a place of manufacture, a date of manufacture, a time of manufacture, a model number, an application of the service component element 104 (e.g., air, fuel, water, lubricant, etc.), and the like.

In some arrangements, the tag 112 is constructed in a manner that prohibits removal and replacement of the tag 112 (e.g., from a first service component element to a second service component element) to prevent reuse or over usage of the tag 112. This may be achieved through the use of a holographic RFID tag that is self-destructive if the tag 112 is removed from the service component element 104. For example, the components of the tag 112 may be placed across different physical layers of the media bearing the tag such that if the tag is removed, the antenna 410 is separated from the rest of the tag 112 thereby rendering the tag 112 inoperable.

Figure 5:
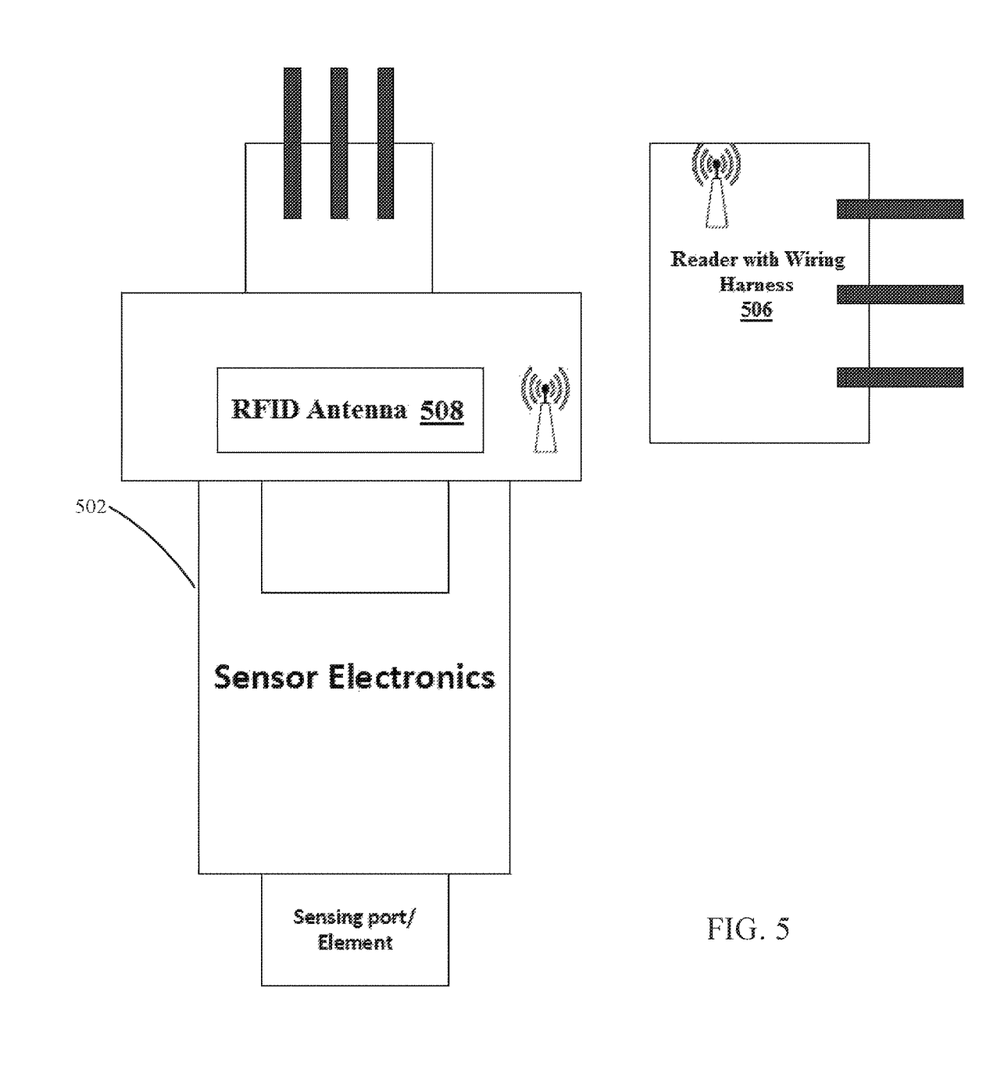
FIG. 5 shows a sensor with and without the addition of receiver hardware for close-range communications according to an example embodiment.

Referring to FIG. 5, a sensor with and without the addition of receiver hardware for close-range communications is shown according to an example embodiment. In some embodiments, the sensor is a single-ended pressure sensor or a differential pressure ("dP") sensor. FIG. 5 shows a sensor 502, a wiring harness with receiver hardware 506, and an antenna for receiving close-range communications 508. In some embodiments, sensor 502 corresponds to a sensor module 126. The sensor 502 is shown with the wiring harness with receiver hardware 506 and the antenna for receiving close-range communications 508 integrated inside the housing of sensor 502. The antenna for receiving close-range communications 508 is electrically connected to the receiver hardware 506. In some embodiments, the other components of a close-range communication reader are located in the housing of the sensor 502. In some embodiments, only the antenna for receiving close-range communications 508 is integrated in to the housing of the sensor 502 and transmits received signals out of the sensor 502 through a connector (e.g., to a wiring harness with receiver hardware 506. Sensor 502 can be a pressure sensor, temperature sensor, fluid quality sensor, and the like. The hardware for close-range communications may be hardware for the use of RFID to exchange digital information, hardware for the use of Bluetooth®, including low-power Bluetooth®, hardware using NFC communication protocols, and other hardware using close-range communication techniques.

Figure 6:
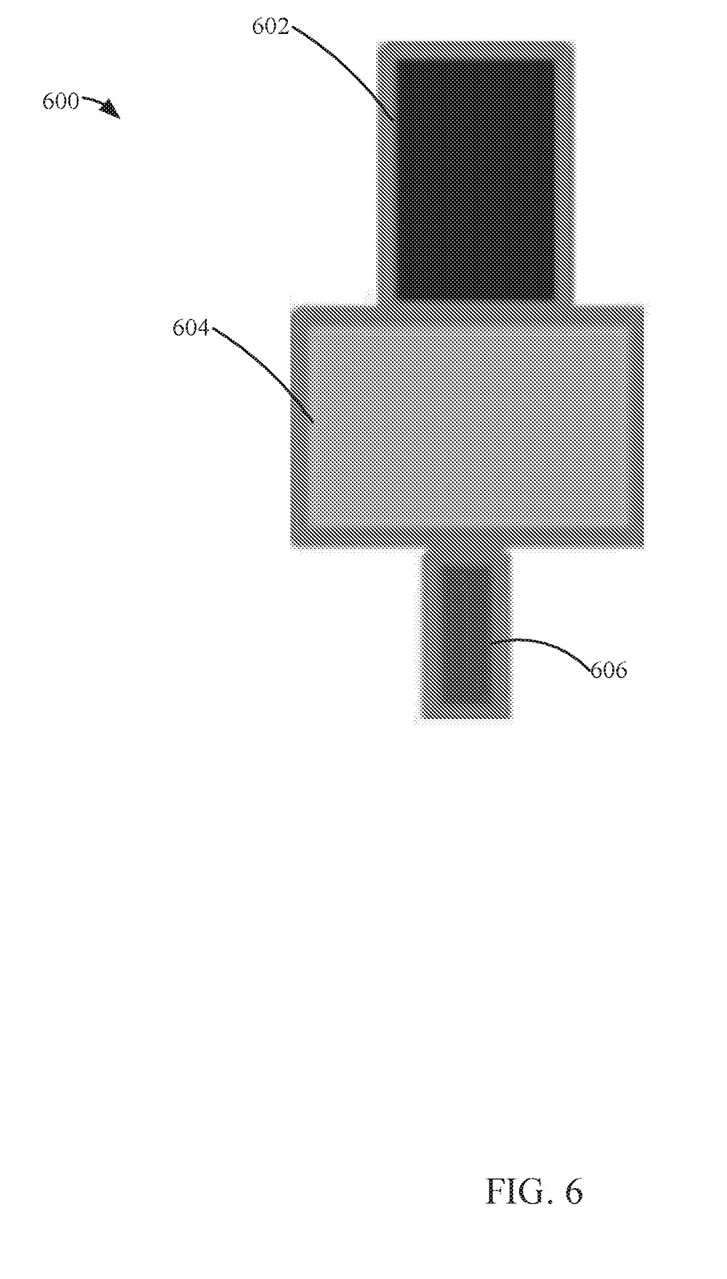
FIG. 6 shown a block diagram of a sensor module according to an example embodiment.

Referring to FIG. 6, a block diagram of a sensor module 600 is shown according to an example embodiment. The sensor module 600 comprises an electrical connection 602, a sensor body 604, and a sensing element 606. In some embodiments, sensor module 600 corresponds to sensor module 126. The electrical connection 602 comprises mating connectors and electrical pins of the sensor module 600. The electrical connection 602 can be a potential location of an antenna electrically connected to a close-range communication reader or a potential location for both the antenna and the other components of the close-range communication reader. The sensor body 604 comprises the sensor electronics and sensor logic of the sensor module 600. The sensor body 604 can be a potential location of an antenna electrically connected to a close-range communication reader or a potential location for both the antenna and the other components of the close-range communication reader. The other components of the close-range communication reader may comprise the components to receive and decode the signals from the antenna. In some implementations, the antenna is implemented as an independent dongle integrated into a wiring harness connection to the sensor module 600. The close-range communication reader may also be integrated. The integration into the wiring harness connection may be a splice that overlays the transmitted message (e.g., a CAN message) to a data line of the wiring harness. The power to the close-range communication reader can be provided by the same wire(s) from the wiring harness providing power to the sensor module 600.

In some embodiments, the sensor module 600 is CAN-based and provided additional information to the ECM including signals received from the antenna electrically connected to the close-range communication reader. The CAN message indicates to the ECM, stand-alone service tool, or an aftermarket vehicle monitoring system if a service component is authentic. Other information, for example a date code, can be transmitted. The service component contains a tag that is readable by the close-range communication reader. The sensor module 600 can provide information from the antenna receiving signals read from the tag directly or analyze the signals using the close-range communication reader and send the data obtained from the analysis in the CAN message. The CAN message can indicate whether the service component is authentic.

In some embodiments, the antenna electrically connected to a close-range communication reader or both the antenna and the other components of the close-range communication reader is integrated as an electrical connection by an independent splice between the sensor module 600 and a wiring harness. The splice is electronically connected to the sensor module 600 and the wiring harness contains an additional output pin to send a signal through the wiring harness that a service component is authentic. In some embodiments, the reader is directly embedded in the wiring harness without a splice. The power to the close-range communication reader can be provided by the same wire(s) from the wiring harness providing power to the sensor module 600.

In some embodiments, the sensor module 600 comprises an additional pin that gives a high/low output indicating whether the service component is authentic. For example, the close-range communication reader is integrated into the sensor module 600 but the output is high/low.

Figure 7:
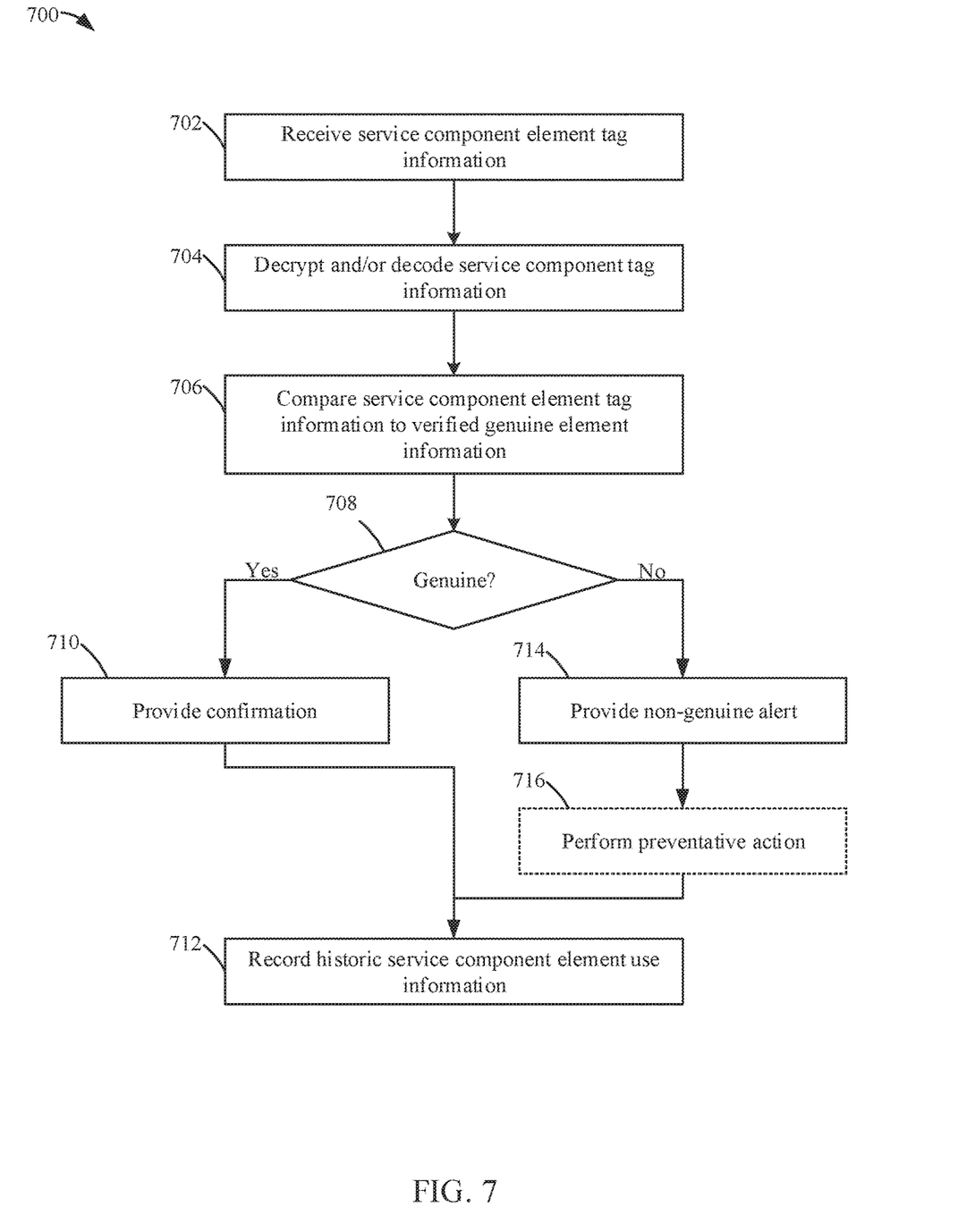
FIG. 7 shows a flow diagram of a method of verifying a service component element as being authentic or genuine according to an example embodiment.

Referring to FIG. 7, a flow diagram of a method 700 of verifying a service component element as being authentic or genuine is shown according to an example embodiment. In some arrangements, the method 700 is performed at every activation of the automotive system 102 (e.g., at every key-on situation for an internal combustion engine). In some arrangements, the method 700 is performed by the service component authentication system 122. In other arrangements, the method 700 is performed by the MS module 114. In further arrangements, the method 700 is performed by the technician device 118. For ease of discussion, the following discussion of the method 700 is provided from the perspective of the service component authentication system 122.

The method 700 begins when service component element tag information is received at 702. The service component authentication system 122 receives information gathered from the tag 112 from either the sensor module 126, MS module 114 or the technician device 118 via the network 124. In arrangements where the service component element tag information is received from the sensor module 126, either the close-range communication reader is integrated in to the sensor module 126 and connected to CAN, the close-range communication reader is integrated in to a wiring harness of sensor module 126, or the close-range communication reader is spliced into a wiring harness connecting the sensor module 126 to another component (e.g., MS module 114) and can overlay transmitted messages (e.g., CAN messages) on the network. In arrangements where the service component element tag information is received from the MS module 114, the service component element 104 is installed in the automotive system 102 prior to receiving the service component element tag information at 702. In arrangements where the service component element tag information is received from the technician device 118, the service component element tag information may be received prior to the service component element 104 being installed in the automotive system 102 (e.g., by the technician scanning the box the service component element 104 was packaged in or the tag 112 on the service component element 104 prior to installing the service component element 104 in the automotive system 102) or after the service component element 104 is installed in the automotive system 102. The service component element tag information relates to identification information that uniquely identifies the service component element 104 installed in the automotive system 102 (e.g., a unique identification number associated with the service component element 104). In some arrangements, the service component element tag information is encrypted. The service component element tag information is decrypted and/or decoded at 704. In arrangements where the received service component element tag information is encrypted, the service component element tag information is decrypted (e.g., with an encryption key provided by the manufacturer of the service component element 104). In some arrangements, the service component element tag information is received along with system 100 information, such as equipment type, vehicle type, model numbers, internal combustion engine information, filter life span, miles of usage, filter restriction, geographical information of the system, and the like.

The service component element tag information is compared to verified genuine service component element information at 706. The service component authentication system 122 compares the service component element tag information with verified genuine service component element information stored in the service component element database 312. The verified genuine service component element information may relate to a filter identification number or an algorithm that verifies the received service component element tag information. The algorithm may include comparing a number of bits contained in the received service component element identification code, performing mathematical equations on the received service component element identification code, and the like. Based on the comparison at 706, the service component authentication system 122 determines whether the service component element installed in the automotive system is genuine at 708. In some arrangements, a service component element 104 may be determined to be "non-genuine" if the service component element 104 has been used in multiple different automotive systems 102 thereby preventing reuse of an originally genuine service component element 104.

If the service component element is determined to be genuine, a confirmation may be provided at 710. The service component authentication system 122 can transmit a confirmation to the MS module 114 and/or to the technician device 118 to alert the operator of the system 100 (and/or the technician installing the service component element 104) that the service component element is genuine.

If the service component element is not determined to be genuine, a non-genuine alert may be provided at 714. The service component authentication system 122 can transmit a non-genuine alert to the MS module 114 and/or to the technician device 118 to alert the operator of the system 100 (and/or the technician installing the service component element 104) that the service component element 104 is not genuine. In arrangements where the alert is transmitted to the MS module 114, the MS module 114 can transmit the received non-genuine alert to the engine control module 120, which can in turn trigger a warning to an operator of the system 100 (e.g., a dashboard light, an alarm, etc.). In some arrangements, preventative action is performed at 716. The preventative action helps reduce the risk of damage to the downstream component 106 (e.g., to the internal combustion engine). The service component authentication system 122 can transmit instructions to the MS module 114 to activate the preventative action. The preventative action may be to prevent the component 106 from activating (e.g., prevent the internal combustion engine from turning on), shut the component 106 down (e.g., turn the internal combustion engine off), restrict the operation of the component 106 (e.g., derate the internal combustion engine), or the like.

Historic service component element use information may be recorded at 712. The service component authentication system 122 records information concerning the installed service component element 104 in the service component element database 312. The information concerning the installed service component element 104 is associated with the automotive system 102. For example, the database may be updated to indicate the date that the service component element 104 was installed and whether the service component element 104 is genuine. The information in the service component element database 312 may be used, for example, in assessing future warranty claims relating to the automotive system 102 and/or to the component 106.

In some arrangements, the method 700 is repeated for each tag 112 scanned that is associated with the service component element 104. For example, in some arrangements, the service component authentication system 122 receives information concerning two tags 112 associated with the service component element 104: a first tag 112 scanned by the technician device 118, and a second tag 112 scanned by, for example sensor module 126, via the tag reader 116. The first tag 112 may be positioned on the packaging associated with the service component element 104, while the second tag 112 may be affixed to the service component element 104. In such arrangements, steps 702-706 may be performed twice in parallel before determining whether the service component element 104 is genuine. If at least one of the tags 112 proves to be inconsistent with the verified tag information, the service component element 104 may be determined to be non-genuine at 708. Accordingly, in such arrangements, the service component element 104 is authenticated through a two-factor authentication process.

Although described as being performed by the service component authentication system 122, it should be understood that the MS module 114 can also perform the method 700 in the same manner as described above. In such arrangements, the MS module receives the service component element tag information from the tag reader 116 at 702. The remaining steps of the method 700 are substantially the same as described from the perspective of the service component authentication system 122.

Although described as being performed by the service component authentication system 122, it should be understood that the technician device 118 can also perform the method 700 in the same manner as described above. In such arrangements, the technician device 118 receives the service component element tag information by scanning the tag 112 (e.g., via an RFID antenna, via a camera, via a barcode scanner, etc.) at 702. The remaining steps of the method 700 are substantially the same as described from the perspective of the service component authentication system 122.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, structures, shapes and proportions of the various elements, values of parameters, mounting arrangements, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Some of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor of the MS module 114 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer, partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   an automotive system configured to operably connect to a service component;
   a sensor module comprising:
      a module housing,
      a wiring harness connector,
      a sensor body positioned within the module housing,
      a sensing element positioned within the module housing and structured to sense a characteristic associated with the service component when the service component is operably connected to the automotive system, and
      an antenna positioned within the module housing and located at one of the wiring harness connector or the sensor body, the antenna structured to communicate service component tag information of a tag associated with the service component to a close-range communication reader, the service component tag information being different from the characteristic associated with the service component; and
   a monitoring system comprising a processing circuit communicatively coupled to the sensor module via the wiring harness connector, the processing circuit comprising a processor and memory, the memory comprising instructions, when executed by the processor, cause the processing circuit to receive the service component tag information from the sensor module.

2. The apparatus of claim 1, wherein the automotive system is a filtration system, and wherein the monitoring system is a filtration monitoring system.

3. The apparatus of claim 1, further comprising a service component authentication system configured to compare the service component tag information with a list of verified genuine service component information, and wherein the memory further comprises instructions that cause the processing circuit to transmit the service component tag information to the service component authentication system.

4. The apparatus of claim 1, wherein the memory further comprises instructions that cause the processing circuit to store the service component tag information from the sensor module in the memory.

5. The apparatus of claim 1, further comprising an engine control module, and wherein the memory further comprises instructions that cause the processing circuit to transmit status information comprising a result of the comparison to the engine control module.

6. The apparatus of claim 1, wherein the sensor module comprises the close-range communication reader, and wherein the antenna and the close-range communication reader are contained in the module housing.

7. The apparatus of claim 1, wherein the close-range communication reader is an RFID reader, and wherein the tag associated with the service component comprises an RFID tag.

8. The apparatus of claim 3, wherein the service component tag information is encrypted, and the service component authentication system is further configured to decrypt the service component tag information, and wherein the decrypted service component tag information is what is compared with the list of verified genuine service component information.

9. The apparatus of claim 3, wherein the service component authentication system is further configured to determine the service component is non-genuine based on the comparison and transmit a non-genuine alert to the monitoring system consequent to the determination.

10. The apparatus of claim 9, wherein the monitoring system transmits the non-genuine alert to an engine control module, and wherein the engine control module is configured to trigger a visual warning or auditory warning consequent to receiving the non-genuine alert.

11. The apparatus of claim 10, wherein the visual warning is a dashboard light and the auditory warning is an alarm.

12. An apparatus, comprising:
a sensor module comprising:
a module housing,
a wiring harness connector,
a sensor body positioned within the module housing,
a sensing element positioned within the module housing and structured to sense a characteristic associated with a service component when the service component is operably connected to a filtration system, and
an antenna positioned within the module housing and located at one of the wiring harness connector or the sensor body, the antenna structured to communicate service component tag information of a tag associated with the service component to a close-range communication reader, the service component tag information being different from the characteristic associated with the service component.

13. The apparatus of claim 12, further comprising:
the filtration system configured to operably connect to the service component; and
a filtration monitoring system comprising a processing circuit communicatively coupled to the sensor module, the processing circuit comprising a processor and memory, the memory comprising instructions which, when executed by the processor, cause the processing circuit to:
receive the service component tag information from the sensor module, and
compare the service component tag information with a list of verified genuine service component information.

14. The apparatus of claim 13, further comprising an engine control module, and wherein the memory further comprises instructions that cause the processing circuit to transmit status information comprising a result of the comparison to the engine control module.

15. The apparatus of claim 12, wherein the sensor module comprises the close-range communication reader, and wherein the antenna and the close-range communication reader are contained in the module housing.

16. The apparatus of claim 13, wherein the close-range communication reader is an RFID reader, and wherein the tag associated with the service component comprises an RFID tag.

17. The apparatus of claim 13, wherein the service component tag information is encrypted, and the memory of the filtration monitoring system further comprises instructions which cause the processing circuit to decrypt the service component tag information, and wherein the decrypted service component tag information is what is compared with the list of verified genuine service component information.

18. The apparatus of claim 13, further comprising an engine control module, and wherein the memory further comprises instructions that cause the processing circuit to determine the service component is non-genuine based on the comparison and transmit a non-genuine alert to the engine control module consequent to the determination.

19. The apparatus of claim 18, wherein the engine control module is configured to trigger a visual warning or auditory warning consequent to receiving the non-genuine alert.

20. The apparatus of claim 19, wherein the visual warning is a dashboard light and the auditory warning is an alarm.

21. The apparatus of claim 1, wherein:
the sensing element is structured to sense one of a pressure, a temperature, and a fluid quality characteristic of the service component; and
the antenna is structured to wirelessly receive service component tag information from the tag associated with the service component and provide the service component tag information as an output via a pin of the wiring harness connector.

* * * * *